March 7, 1933.   H. JUNKERS   1,900,502

AIRCRAFT

Filed Oct. 21, 1931

Inventor:
Hugo Junkers
by Karl Küsgen
Atty.

Patented Mar. 7, 1933

1,900,502

UNITED STATES PATENT OFFICE

HUGO JUNKERS, OF DESSAU, GERMANY

AIRCRAFT

Application filed October 21, 1931, Serial No. 570,080, and in Germany October 28, 1930.

My invention relates to aircraft, and more particularly to aircraft attaining high altitudes. Such aircraft is equipped with airtight chambers for the passengers and the crew which have been termed "altitude chambers" and in which a pressure corresponding substantially to the atmospheric pressure at ground level is permanently maintained by suitable means.

If an altitude chamber leaks or the means fail for maintaining therein the normal pressure, the persons in the chamber will become unconscious or at least unable to perform their duties. If trouble of this kind occurs in the chamber of the pilot and he is temporarily disabled, the risk to the craft is obviously very great.

It is an object of my invention to prevent accidents due to a reduction of pressure in an altitude chamber. To this end I provide a pressure-sensitive element in the altitude chamber which is operatively connected to means for cutting out the engine if the pressure in the altitude chamber falls below a predetermined minimum.

The means for cutting out the engine may act on any vital member thereof, for instance, on its ignition system or on its fuel supply. When the engine has been cut out, the aircraft, normally an airplane, starts to glide and soon attains lower regions of higher pressure so that the persons who have become unconscious or otherwise unable to perform their duties, will soon recover and there is still time to land in safety.

The pressure-sensitive element in the altitude chamber may be of any suitable kind. In the present instance a hollow and preferably evacuated element of the kind used in aneroid altimeters will be described which is so designed that it expands upon reduction of the pressure in the altitude chamber and, in expanding, cuts out the engine. For instance, the hollow element itself or mechanism connected to it, may short-circuit the ignition magnet.

The means for cutting out the engine may also be designed on the servo principle, the element or a member actuated by it operating a source of energy of any suitable kind, such as electric energy, gas or liquid under pressure, mechanically actuated gearing, or the like, by which a servo motor is actuated and cuts out the engine, for instance, by interrupting its fuel supply.

In the drawing affixed to this specification and forming part thereof two embodiments of my invention are illustrated diagrammatically by way of example.

In the drawing

Figure 1:
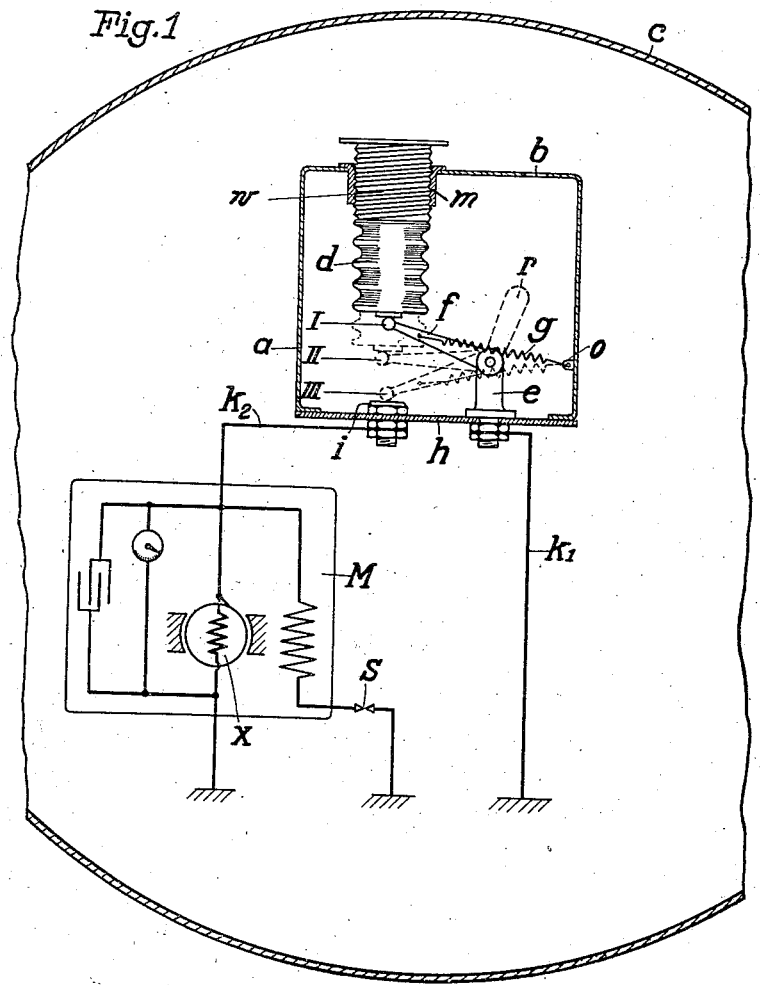
Fig. 1 is a section of an altitude chamber showing a pressure-sensitive element in combination with means for short-circuiting the ignition magnet of the engine.

Referring now to the drawing, and first to Fig. 1, $c$ shows a portion of the wall of an altitude chamber, $a$ is a casing in the chamber, $b$ is an opening in the wall of the casing connecting its interior to the altitude chamber $c$, $w$ is a threaded support adapted to fit in a sleeve $m$ at the top of the casing $a$, and $d$ is a pressure-sensitive element resembling the element of an aneroid altimeter which is attached to the lower or inner end of the threaded support $w$. As mentioned, the element $d$ is preferably evacuated but this is not necessary, the condition being only that the element should be sensitive to a fall of the pressure in the chamber $c$ below a predetermined minimum. $h$ is the base plate of the casing $a$ which in the present instance is made of insulating material for a reason which will be explained below. $e$ is a bearing on the base plate $h$, $f$ is a lever which is pivoted in the bearing at one end and adapted to engage below the end of the element $d$ with its other end, $r$ is a handle on the pivot of the lever outside the casing $a$, and $g$ is a spring which is attached to the lever $f$ at one end, and to the casing $b$ at the other end, the bracket $o$ by which this end of the spring is held, being so positioned with respect to the pivot of the lever $f$ in the bearing $e$ that it throws over the lever to one or to the other side of the pivot if the lever departs from its neutral position II.

$k_1$ is a conductor connecting the bearing $e$ to the body of the aircraft, $i$ is a contacting member which is secured in the base plate $h$ in line with the axis of the element $d$, and $k_2$ is a conductor connecting the contacting member $i$ to the primary coil $x$ of an ignition magneto M which supplies the sparking plugs of the engine (not shown). The details of the magneto form no part of the present invention and therefore have not been shown and described in detail. S shows diagrammatically the sparking gaps at the plugs of the engine.

Obviously it is not necessary that the base plate $h$ of the casing $a$ should be of insulating material, as the bearing $e$ and the contacting member $i$ might be insulated from a plate of conducting material.

In operation the element $d$ is adjusted by means of the threaded sleeve $w$ and under the normal pressure of the air in the altitude chamber $c$ is shortened to the length shown in full lines. The spring $g$ holds the lever $f$ engaged with the lower end of the element in the position I, while the pressure is normal. If the pressure falls in consequence of any trouble, such as leakage of the altitude chamber $c$, or failure of the means for maintaining the normal pressure therein, the element $d$ expands and entrains the lever $f$ as shown in dotted lines. At II the axes of the lever $f$ and the spring $g$ coincide and a very slight expansion of the element $d$ below this point causes overthrowing of the lever $f$ into the position III in which the free end of the lever engages the contacting member $i$ and short-circuits the primary coil $x$ through $k_1$, $e$, $f$, $i$ and $k_2$. The magneto M now becomes inactive, the engine stops and the airplane starts gliding automatically so that it soon reaches lower regions of higher pressure in which the disabled pilot will recover and prevent an accident.

The position of the point II at which the lever $f$ is in its neutral position, may be varied in conformity with the pressure conditions by adjusting the element $d$ through the medium of its threaded support $w$. The position of the point II determines the minimum to which the pressure in the chamber $c$ is permitted to fall before the element $d$ starts to operate. If the pressure limit is understepped for the slightest amount, the lever $f$ is jerked from II to III and the magneto M is short-circuited as described. By means of the handle $r$ the lever $f$ is returned into the position I after normal pressure conditions have been re-established, and held engaged with the element $d$ by spring $g$.

Figure 2:
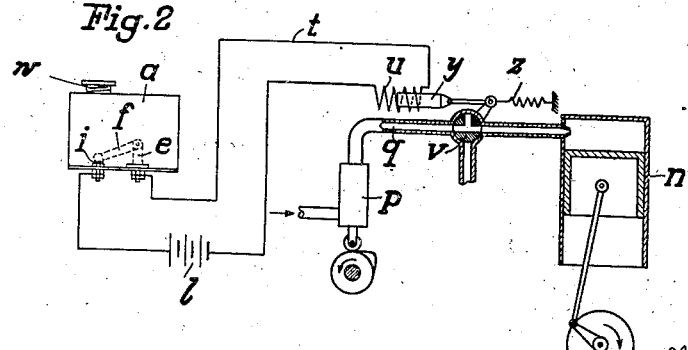
Fig. 2 is a partly sectional diagram of a system including a servo motor under the control of the pressure-sensitive element for interrupting the fuel supply of the engine.

Referring now to Fig. 2, the casing $a$ with the mechanism therein is designed as described with reference to Fig. 1 but in this instance the bearing $e$ and the contacting member $i$ are connected to a circuit $t$, with a battery $l$ and the coil $u$ of a servo motor for interrupting the fuel supply of the engine $n$. $y$ is a core which is adapted to be attracted by the coil $u$ when the coil is excited, and $z$ is a spring which returns the core into its initial position when the coil $u$ is de-energized. $p$ is a fuel pump which is actuated by any suitable means, for instance, the cam indicated below its cylinder, $q$ is the delivery pipe of the pump, and $v$ is a two-way valve in the delivery pipe $q$ which is operatively connected to the coil $y$.

In the position of parts illustrated in Fig. 2 the valve $v$ opens the supply of fuel to the engine $n$, which may be of the Diesel type, but the lever $f$ has just made contact at $i$ so that in the next instance the coil $u$ will be energized and attract its core $y$, rotating the valve $v$ through 90 degrees. In this position of the valve the connection of the pipe $q$ with the cylinder of the engine is interrupted and the fuel which is delivered by the pump returns to the supply tank through the short bore of the valve which now registers with the rear portion of the pipe $q$ and the lower portion of the through bore which registers with the return pipe. The engine $n$ will now stop for want of fuel.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. An aircraft comprising an altitude chamber, a pressure-sensitive element in said altitude chamber, and means operatively connected to said element for cutting out the motive power of said craft.

2. An aircraft comprising an altitude chamber, a pressure-sensitive element in said altitude chamber, and means including a throw-over mechanism operatively connected to said element for cutting out the motive power of said craft.

3. An aircraft comprising an altitude chamber, a pressure-sensitive element in said altitude chamber, a rocking lever adapted to be operated by said element, resilient means for jerking said lever beyond a neutral position, and means for cutting out motive power of said craft which are so positioned as to be engaged by said lever when it has moved beyond its neutral position in a given direction.

4. An aircraft comprising an altitude chamber, a magneto for the ignition of its engine, a pressure-sensitive element in said altitude chamber and means operatively connected with said element for short-circuiting said magneto.

5. An aircraft comprising an altitude chamber, a circuit for controlling the motive power of said craft, a rocking contacting lever connected to one end of said circuit, a contact connected to the other end of said circuit and adapted to be engaged by the free end of said rocking lever, a pressure-sensitive element in said altitude chamber adapted to operate said rocking lever, and a spring connected to said rocking lever which is so arranged as to move said rocking lever toward said element or said contacting member beyond the neutral position of said lever.

6. An aircraft comprising an altitude chamber, a pressure-sensitive element in said altitude chamber, and means including a servo motor and operatively connected to said element for cutting out the motive power of said craft.

7. An aircraft comprising an altitude chamber, a circuit, a servo motor in said circuit, means operatively connected to said motor for cutting out the motive power of said craft, a pressure-sensitive element in said altitude chamber, and means operatively connected to said element for controlling said circuit.

8. An aircraft comprising an altitude chamber, means for supplying fuel to the motive power plant of its engine, means for interrupting the fuel supply, a servo motor operatively connected to said interrupting means, a pressure-sensitive element in said altitude chamber, and means operatively connected to said element for controlling said motor.

In testimony whereof I affix my signature.

HUGO JUNKERS.